April 7, 1925.
T. M. EYNON
1,532,530
GAS INDICATOR FOR AUTOMOBILE DASHBOARDS
Filed March 17, 1921   2 Sheets-Sheet 1
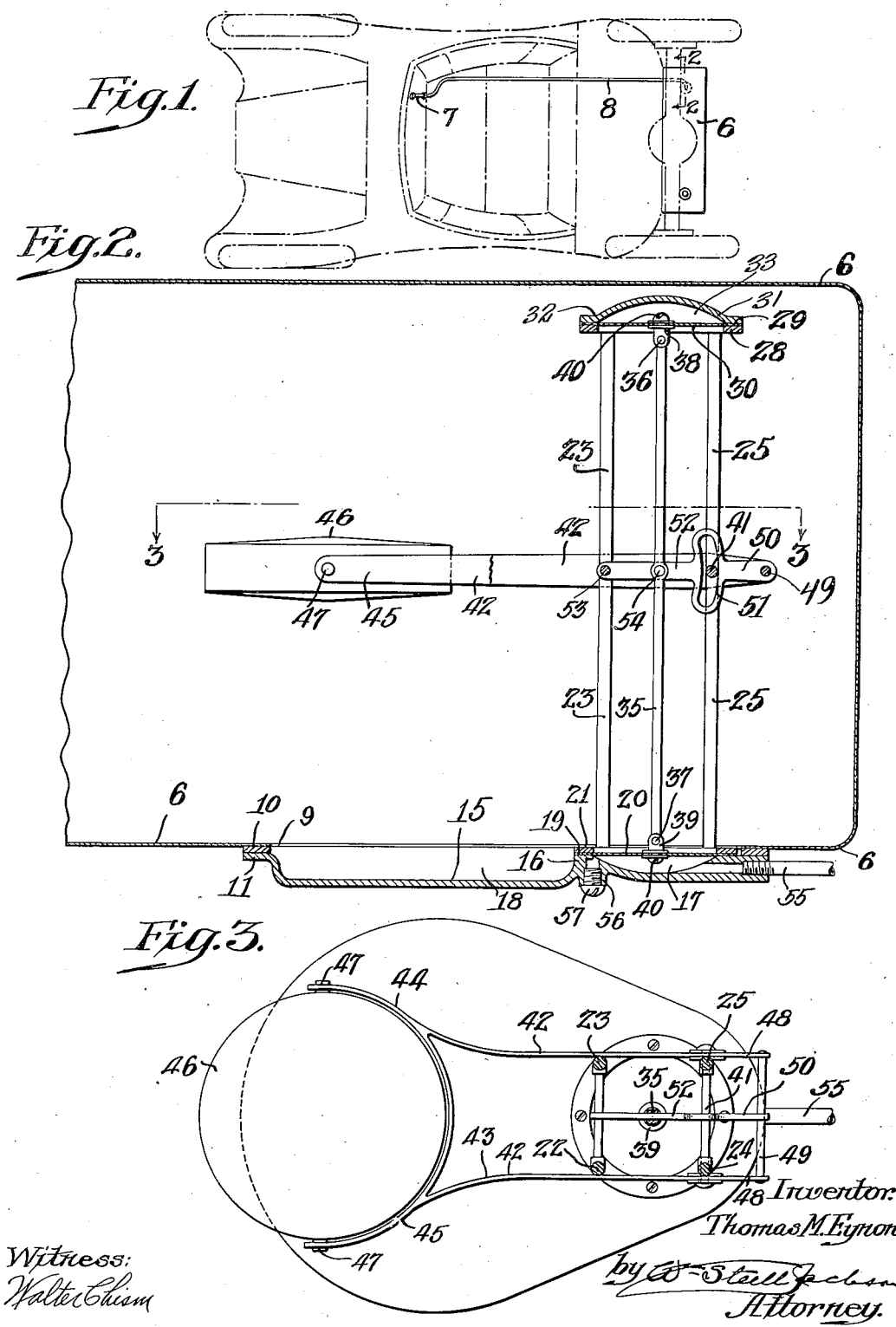

April 7, 1925.
T. M. EYNON
1,532,530
GAS INDICATOR FOR AUTOMOBILE DASHBOARDS
Filed March 17, 1921     2 Sheets-Sheet 2
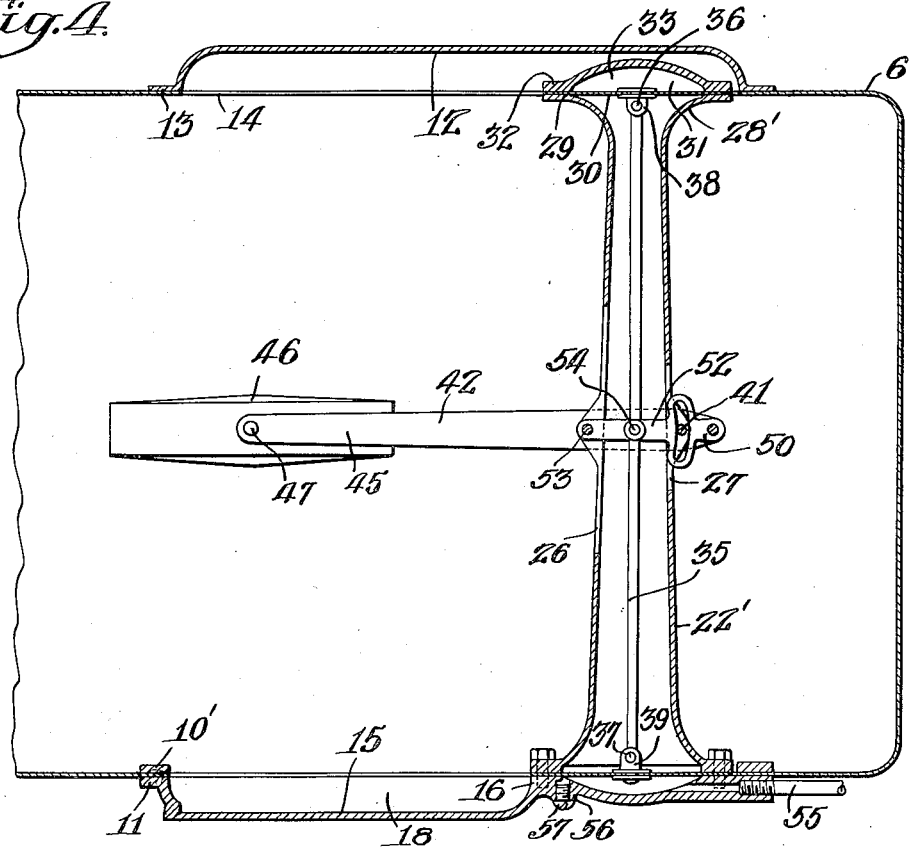
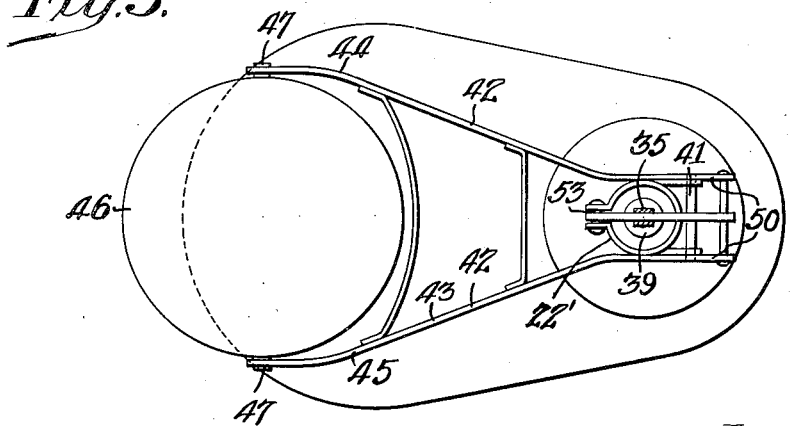
Witness:
Walter Ching
Inventor:
Thomas M. Eynon
by
Attorney.

Patented Apr. 7, 1925.

1,532,530

UNITED STATES PATENT OFFICE.

THOMAS M. EYNON, OF PHILADELPHIA, PENNSYLVANIA.

GAS INDICATOR FOR AUTOMOBILE DASHBOARDS.

Application filed March 17, 1921. Serial No. 453,165.

*To all whom it may concern:*

Be it known that I, THOMAS M. EYNON, a citizen of the United States, residing at Philadelphia, in the county of Philadelphia and State of Pennsylvania, have invented a certain new and useful Gas Indicator for Automobile Dashboards, of which the following is a specification.

My invention relates to fluid indicators meant to show at the dash-board or other convenient place, the height of gasoline in the gasoline tank of a vehicle.

The purpose of my invention is to apply a flat float to gasoline tank measurement, relieving the total limit of the float extension.

A further purpose is to hinge or pivot the float upon an operating lever so that it will lie flat with the gasoline level.

Further purposes will appear in the specification and in the claims.

I have preferred to illustrate my invention by but one general form thereof, selecting a form which is practical, efficient and inexpensive, which is very trustworthy and which at the same time well illustrates the principles of my invention.

Figure 1 is a top skeleton view of a structure of an automobile to which my invention is applied.

Figure 2 is a section upon an enlarged scale of Figure 1 upon line 2—2.

Figure 3 is a section of Figure 2 upon line 3—3.

Figures 4 and 5 are sections corresponding to Figures 2 and 3 and showing slightly modified forms of my invention.

In the drawings similar numerals indicate like parts.

The structure shown in Figure 1 is intended to indicate any form of automobile since my invention is applicable to all forms. In the figure the tank 6 is shown as connected with the indicator 7 by means of a pipe 8.

My invention is applicable to existing tanks as well as new constructions. An opening is cut in the bottom of the tank at 9 about which I show a reinforcing flange 10 to which the flange 11 is attached by brazing or welding. In Figure 4 the flange 10' is interior, in which case the opening should be elongated to allow the flange to pass through. In this form also a cap 12 is shown at the top which is not shown in Figure 1. It is applied by flange 13 above an opening 14 in the upper end of the tank in order to accommodate the float in its extreme upper position, so that higher indication may be recorded than would be the case where the float is stopped by the normal top of the tank.

The bottom closure 15 carries a flange 16 within which is formed a concavity 17. The closure is dropped below the tank bottom to form a recess 18 within which the float is adapted to drop.

The flange 16 is faced to form a seat 19 for a diaphragm 20, which diaphragm is held in place by a ring 21 by which the frame rods 22, 23, 24, 25 are supported.

In Figure 4 instead of having separate strips or bars a tubular standard 22' is used to carry the lever structure.

In Figures 2 and 3. the rods or standards carry at their upper ends a flange 28, which is provided in Figure 4 by the belling of the tube at 28'. In either event the flanged structure affords a seat 29 for an additional diaphragm 30. This diaphragm is held in place by a closed cap 31 flanged at 32. This structure is swelled away from the diaphragm to provide a recess 33 which, like recess 17 is shut off from communication with the tank. Both of these recesses vary in cubical contents with movement of the diaphragms. Movement of the upper diaphragm upwardly reduces the cubical contents of the recess 33 but increases the cubical contents of the tank available for gasoline. Movement of the lower diaphragm upwardly increases the cubical contents of recess 17, but decreases the cubical contents of the tank available for gasoline. The converse of these is also true.

The two diaphragms are connected by a rod 35 for the purpose of causing them to move in unison so that increase of available cubical contents of the tank by movement of one, or its reduction, as the case may be, to be offset by a corresponding reduction or increase of the available cubical contents by reason of movement of the other diaphragm as a result that movement of the two diaphragms together will maintain the cubical contents of the tank unchanged by their movement. For the same reason my mechanism is not affected by pressure or vacuum conditions in the tank.

The rod 35 may be connected with the two diaphragms by pins 36 and 37 through ears 38 and 39 held by buttons 40.

Rods 24 and 25 support a pin 41, upon which is pivoted a pair of arms 42 making up a lever 43 which is spread at 44 and 45 so as to embrace a flat float 46. The float is pivoted to the lever as by pins 47 so as to be free to turn in the lever and always lie flat within and upon the surface of the liquid in the tank. These lever arms 42 are extended at 48 to pivotally connect through a pin 49 with a lever 50 which is shown as yoked at 51 so as to span the pivot pin 41 and permit extension of the lever beyond this pivot pin toward the rod as at 52.

This lever 50 is pivoted at one end about a pin 53 resting in rods 22 and 23 so as to swing about this pivot. At an intermediate point it is connected by a pin 54 with the rod 35 so that the lifting of the float will lift the lever 43, depress the end of the lever at 48, depress the end of the lever 50 and depress the rod 35 with consequent downward movement of both diaphragms.

The recess adjacent one of the diaphragms, preferably the lower diaphragm—is filled with fluid—preferably liquid—and is connected with the gauge, resulting in expulsion of the liquid within the space 17 preferably or 33 permissibly and the operation of the fluid gauge indicator to show the corresponding variations of the height of the liquid in the tank. When the upper recess is so connected reversal of direction must be provided for. The connection with the space 17 is shown at 55. Means for varying the quantity of liquid within the system is shown through an inlet at 56 which is closed by a screw 57.

In operation, lifting or lowering of the float causes movement of the lever arm 43 with movement of both diaphragms and with a corresponding alteration of the cubical contents of the space at top or bottom which is connected with the fluid indicator gauge. The gauge can of course be made to operate by either pressure or volume alteration and (in so far as the normal pressure change or movement will not be exactly proportional to the change in height of the float) the gauge can be calibrated to correspond. However, even without such calibration my invention has considerable utility in affording the operator visible evidence of the approximate condition of gasoline in the tank. The actual calibration of the gauge affords a further check in enabling him to determine whether or not any of the gasoline has been used since he last operated the car.

Having thus described my invention, what I claim as new and desire to secure by Letters Patent is:—

1. In a fluid pressure indicator for indicating the height of gasoline at an exterior point the combination of a tank, a bottom insert therefor having a relatively flat recess therein, a flat float adapted to fit into said recess in its lowermost position, a lever pivotally connected with said float whereby the float can lie flat upon the surface of the gasoline with variant angular directions of lever, a diaphragm, mechanical connections to operate said diaphragm from said lever and fluid connections operated by said diaphragm for indicating the height of the float.

2. A fluid pressure indicator for indicating at an exterior point the height of gasoline in a tank, comprising a lever, a fixed support therefor, a rod operating from the lever, a diaphragm support providing a recess, a diaphragm covering the recess, connections between the rod and diaphragm whereby the diaphragm is moved by the rod in two directions of movement, a fluid indicating gauge, connections from the recess to the gauge and a flat float for the lever adapted to vary its angular relation to the lever to follow the plane of gasoline surface in combination with a tank within which the indicator is enclosed.

THOMAS M. EYNON.